A. A. CARPER.
BOTTLING MACHINE.
APPLICATION FILED JUNE 1, 1908.

1,012,984.

Patented Dec. 26, 1911.
7 SHEETS—SHEET 4.

Attest
Ewd L. Folson
Bent M. Stahl

Inventor
Albert Alfred Carper
By Spear, Middleton, Donaldson & Spear
Attorneys.

A. A. CARPER.
BOTTLING MACHINE.
APPLICATION FILED JUNE 1, 1908.

1,012,984.

Patented Dec. 26, 1911.
7 SHEETS—SHEET 7.

Attest
Ed. L. Folson
Bert McStahl

Inventor
Albert Alfred Carper
by Spear, Middleton, Donaldson & Spear,
Attorneys

UNITED STATES PATENT OFFICE.

ALBERT ALFRED CARPER, OF BALTIMORE, MARYLAND, ASSIGNOR TO THE CROWN CORK & SEAL CO., OF BALTIMORE, MARYLAND.

BOTTLING-MACHINE.

1,012,984.  Specification of Letters Patent.  Patented Dec. 26, 1911.

Application filed June 1, 1908. Serial No. 435,975.

*To all whom it may concern:*

Be it known that I, ALBERT ALFRED CARPER, a citizen of the United States, residing at Baltimore city, State of Maryland, have invented certain new and useful Improvements in Bottling-Machines, fully described and represented in the following specification and the accompanying drawings, forming a part of the same.

This invention relates to machines for bottling liquids, and while, as to some of its features, the invention is capable of various other applications, it has particular reference to bottling liquids under pressure, such as carbonated beverages.

One of the objects of the invention is to produce an improved machine for automatically performing the operations of filling and of sealing bottles at high speed and with great accuracy and precision.

A further object of the invention is to produce an improved machine in which the operation of the means for effecting the filling of the bottles is controlled by the presence or absence of the bottle.

A further object of the invention is to produce an improved bottling machine which can be readily adjusted so that it may be capacitated to handle bottles of varying sizes.

A further object of the invention is to produce an improved mechanism for handling the bottle closing devices.

The invention further has in view the improvement in certain details of construction of bottling machines by which the various operations may be quickly and certainly performed.

With these and other objects not specifically referred to in view, the invention consists in certain constructions and in certain parts, improvements and combinations as will be hereinafter fully described and then specifically pointed out.

Referring to the drawings which illustrate one embodiment of the invention, and in which like characters of reference indicate the same parts

Figures 3, 4, 5, 6, 7, 8, 9:
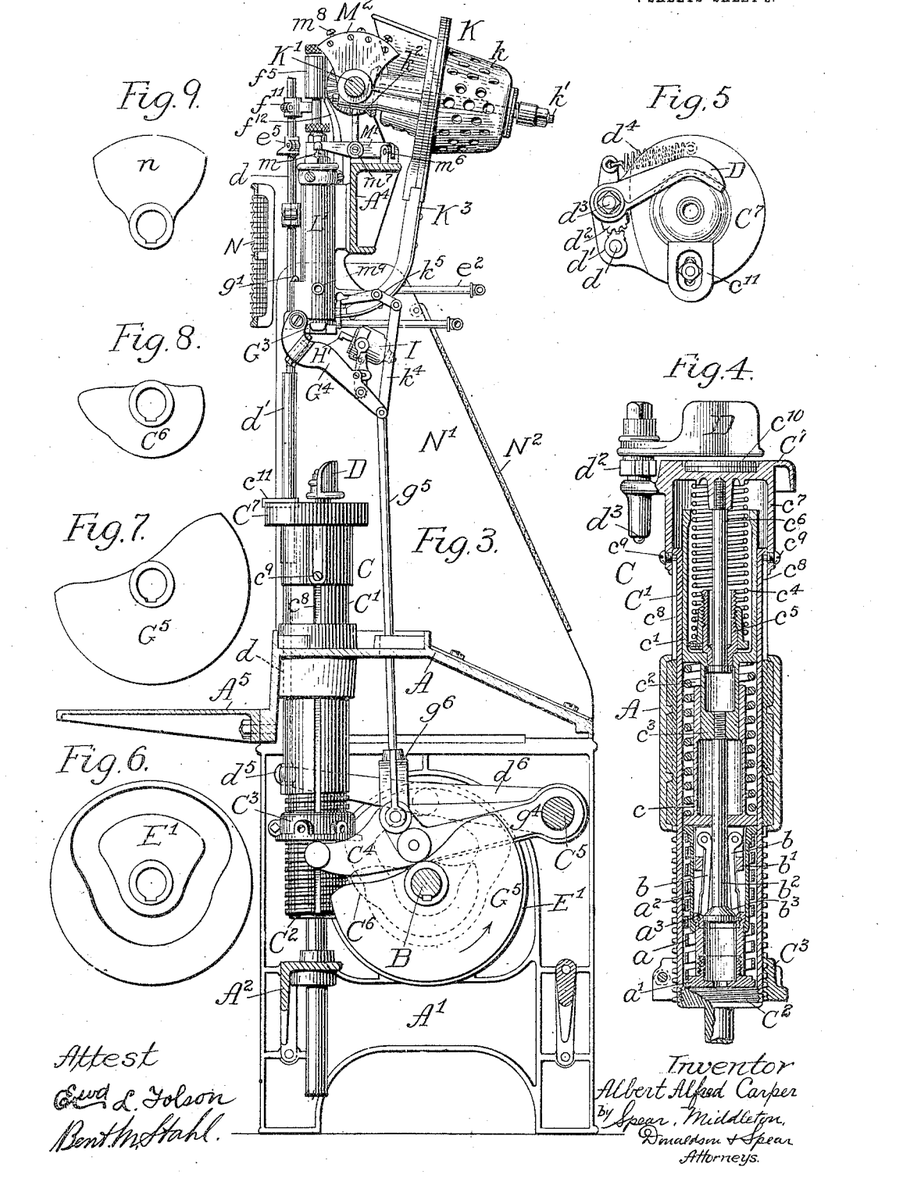
Fig. 3 (Sheet 2) is a side elevation of one of the bottling mechanisms illustrated in Fig. 1, certain parts being shown in section.
Fig. 4 is a central vertical section of one of the bottle presenting devices, parts of a controlling mechanism being shown in this figure.
Fig. 5 is a top view of the construction illustrated in Fig. 4.
Figs. 6, 7, 8 and 9 illustrate certain actuating cams which may be employed.

The frames of machines embodying the invention may be of any suitable construction. In the particular machine selected to illustrate the invention, the frame (see Figs. 1 and 3) includes a central or main plate A and at each end an end plate A', but one of which is shown. The main plate is firmly united to the end plates, and further united and braced by a longitudinal foot plate A². The end plates are provided with integral legs, and at its outer side, each plate has a strong vertical post A³, upon which is mounted a strong horizontal head plate A⁴. At the front side of the machine there may, if desired, be provided a bottle shelf A⁵, for empty and filled bottles, or for boxes containing the same.

While the invention as to some of its aspects may be carried into effect by a machine which embodies only the elements which form a single bottling mechanism, machines which embody the invention in its best form will include a plurality of sets of such elements or bottling mechanisms. Furthermore, when a plurality of sets of mechanisms is employed and the machine embodies the invention in its best form, the sets will be so fixed in the frame as not to move laterally, that is to say, the sets of mechanisms will not have any rotary or traveling movement. The elements which go to form the bottling mechanism or sets thereof may be varied according to the character of liquid to be bottled and the operations to be performed by the machine. Whether, however, the invention be embodied in a machine having only the elements which form a single bottling mechanism, or whether, as in the particular machine illustrated, it be embodied in a machine which has a plurality of sets of such elements or mechanisms, each bottling mechanism or set of bottling mechanisms will include a bottle presenting device. While these bottle presenting devices may be varied widely in construction, in the particular machine illustrated (see Figs. 3 and 4) in which the presenting device as a whole is indicated by the letter C, said device includes a main or outer cylinder C'. As shown, this cylinder has a guide bearing at the main frame plate A, and it is vertically slotted and splined in its bearing for preventing rotation. At its lower end it has a screw-threaded foot block C² provided with a central pendent spindle, serving as a tail guide in a bearing in the foot plate A² of the frame.

In the best constructions embodying the invention means should be provided by which the bottle presenting device or carrier is made adjustable in order that bottles of different lengths may be operated upon. While the construction by which this is effected may be varied, as illustrated, the lower exterior portion of the cylinder C' is provided with a heavy screw-thread, to which is fitted a lock nut C³, split at one side and provided with lugs and a clamping bolt for enabling the relations of the cylinder and nut to be varied, as by rotation of the nut, and then securely locked in position.

In the particular machine shown, the presenting devices are given a reciprocating movement to present the bottles to the filling mechanisms hereinafter referred to. While the means employed may be varied in construction, the lock nut C³ provides a bearing surface for the two ends of a yoke lever C⁴, Fig. 3, hinged upon a horizontal rod C⁵, at the rear of the machine. The lever yoke C⁴ may be actuated by a suitable cam as C⁶, (Figs. 3 and 8) mounted on a cam-shaft, as B.

It has been heretofore stated that machines which embody the invention in its best form will include a plurality of sets of bottling mechanisms. When the invention is embodied in this type of machine, to obtain the best results the construction should be such that the sets of mechanism operate continuously and out of time, that is to say, each of the several operations which are performed by each set are so timed as not to occur simultaneously with the same operation in any other set. This continuous operation out of time enables a large output to be obtained from the machine. It will, of course, be understood that the mechanisms are independent in the sense that the operations performed by one set are not dependent upon and do not affect the operation taking place at another set though the sets are connected up to operate in a certain order or time with respect to each other. Where a plurality of sets of bottling mechanisms are being operated, in the type of machine referred to, they will operate continuously and out of time. This operation out of time, so far as the bottle presenting devices of the particular machine shown are concerned, is obtained by properly setting the operating cams C⁶ on the shaft B, and as to the other devices by a proper arrangement of the operating parts.

In the best constructions embodying the invention, means will be provided for releasing the pressure which the presenting devices exert upon the bottle after the pressure has reached a predetermined amount. As shown, the cylinder C' has within it at its foot (see Fig. 4) a spiral supporting and lifting spring $a$ bearing upon the flange of an externally screw-threaded hub $a'$, which rests upon the foot block C². At its top, this spring underlies the flange of a sleeve $a^2$ slidably on and guided by a tubular extension of the hub $a'$ having at the top thereof an annular hardened steel beveled seat $a^3$ upon which four hinged pendent beveled faced tripping dogs $b$ have endwise bearings. These dogs form a part of the lower section or end of a plunger or piston to which they are hinged at their upper ends, just above a fixed check ring $b'$ which prevents outward displacement of their lower ends from the annular seat $a^3$. These tripping dogs are controlled by a central vertical bolt $b^2$ having its head $b^3$, at its lower end, provided with a top surface beveled reversely from the seat $a^3$, so that the dogs, each having two beveled faces, may firmly bear upon both the seat and the bolt head. This bolt $b^2$ also serves to couple the middle plunger section $c$ to an upper plunger section $c'$, and also to maintain a heavy spring $c^2$ under a predetermined tension. This middle section $c$ is cylindrical and has a flanged base to afford a seat for the heavy spring $c^2$. The cylindrical portion of said base affords a central guide bearing for a tubular hub $c^3$ depending from the upper plunger section $c'$, said hub having a thick lower end into which the threaded upper end of the bolt $b^2$ is screwed. The upper plunger section $c'$ is cylindrical and its lower end, outside its hub, has an annular bearing contact with the spring $c^2$.

The construction of pressure releasing mechanism so far described is similar to that disclosed in United States Letters Patent to William Painter, No. 638,354, December 5, 1899.

The top of the bottle presenting device may be constructed to have a limited yielding movement with respect to the remainder of the device. To effect this, there may be employed a comparatively light spring $c^4$ which has its base upon the flange of a sleeve fixedly mounted upon a tubular screw-threaded bushing $c^5$ having a neck which extends downwardly into the tubular hub $c^3$ of the upper section $c'$ of the piston or plunger. This spring $c^4$ supports the bottle carrier head $C^7$ which has a central pendent screw-threaded boss occupied by the screw end of a bolt $c^6$ having a head, the flange of which abuts against the lower end of the tubular bushing $c^5$, thus providing for varying the tension of this spring. The carrier head $C^7$ may have an annular depending flange $c^7$ slidable on the cylinder $C'$ provided with grooves at $c^8$ which, at their upper ends, may have shoulders engaged by studs $c^9$, in the flange of the carrier head, thus preventing the top from turning as it moves. The top of the carrier head may be recessed for an elastic disk or cushion $c^{10}$, serving as a bottle seat.

Machines embodying the invention will include suitable means for supplying liquid to the bottles to be filled, which means may be varied widely in construction. I the best constructions embodying the invention, the liquid supplying devices will deliver the liquid to be bottled through a filling chamber, the bottle, prior to the delivery of the liquid, having been presented to the filling chamber by the presenting device. In the particular construction illustrated, the filling chamber, indicated at G, is formed at the lower end of the head L', this head being firmly secured to the bar $A^4$ forming a part of the frame.

Figures 17, 18, 19:
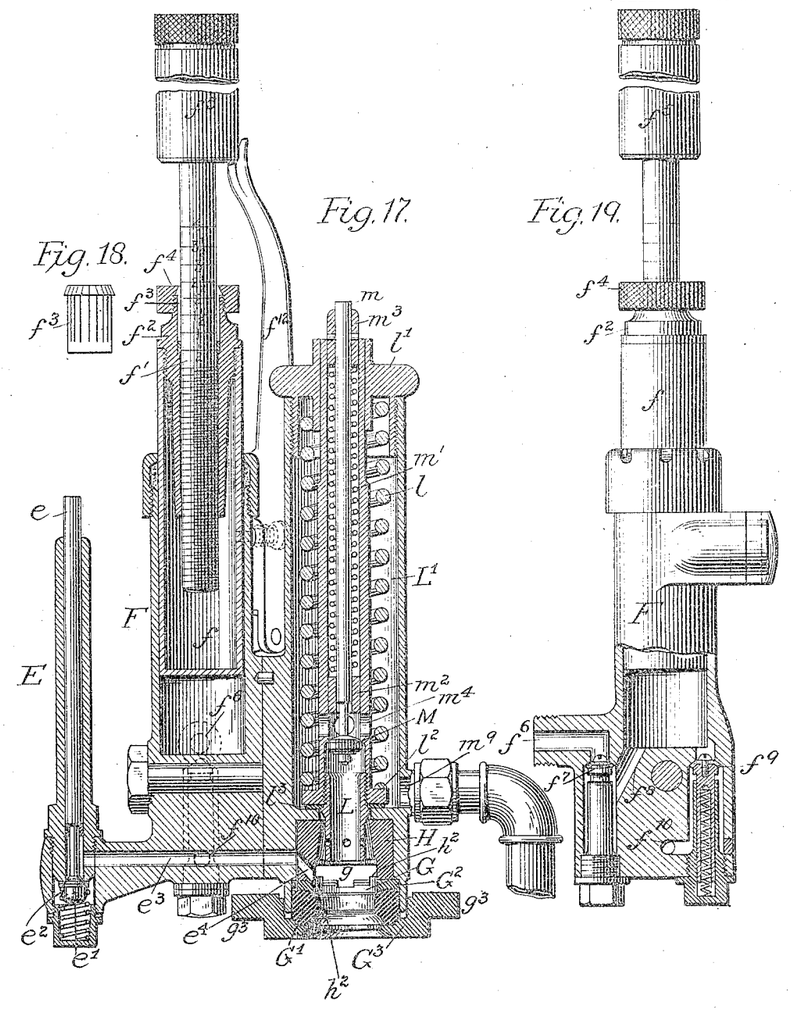
Fig. 17 is an enlarged vertical section of one of the filling heads and the liquid supplying means illustrated in Fig. 1.
Fig. 18 is a detail which may be employed in connection with the pump illustrated in Fig. 17.
Fig. 19 is a side elevation of the pump illustrated in Fig. 17, certain parts being shown in section.

In bottling liquids under pressure, the filling chamber should be tightly closed when the bottle has been introduced thereinto. This may be effected by a gasket G' (see Figs. 17, 20 and 21) which is adapted to be contracted to reduce its central aperture for making packing contact with the bottle. While the contraction of the gasket to make tight contact with the bottle may be effected in any suitable manner, in the particular construction illustrated, there is provided a compressing ring $G^3$ having a pintle $g'$, this pintle being received in a perforation in the main head and being provided with a cross pin to hold it in place. Inside and above the gasket, in the machine shown, there is located an abutment ring $G^2$. In the particular machine illustrated, this abutment ring $G^2$ has, in addition to serving as an abutment for the gasket, an additional function which will be hereinafter referred to.

The compressing movements of the ring $G^3$ may be effected by a pair of arms or levers $G^4$, each of these levers being provided with an adjustable screw $g^2$, these screws being arranged to strike lugs $g^3$ on the compressing ring. The levers $G^4$ may be operated in any suitable manner, as by a link $g^5$ having a yoke $g^6$. This yoke $g^6$ may be connected to arms $g^4$ hinged on the rod $C^5$ and operated by cams $G^5$ on the shaft B.

The means by which the liquid to be bottled is conveyed to the filling chamber, when a filling chamber is employed, may be variously constructed and arranged. In bottling machines it is frequently desirable to bottle combinations of different kinds of liquid, such, for instance, as charged and still liquids. Thus in bottling charged or carbonated beverages, it may be desired to add to each bottle of water a given amount of flavoring extract known as "syrup." When, as in the machine shown, carbonated water having a flavoring extract added thereto is to be bottled, or when, for any reason, it is desired to fill a bottle with a combination of liquids, the connections from the filling chamber will be such as to provide for the handling of the different kinds of liquids. In the particular machine shown, there is provided a duct $e^3$, this duct being arranged to communicate with two sources of liquid supply. One of these sources is indicated by a supply pipe which communicates with a suitable font or carbonating machine. The other source communicates with a syrup holding receptacle, and a suitable pump. The discharge from the pipe $e^2$ into the duct $e^3$ may be controlled in any suitable manner, as, for instance, by a valve E having an operating spindle $e$ extending through and above a housing. In the best constructions, the duct by which the liquid is conveyed to the filling chamber will be arranged to open into the chamber at one side, and will have its discharge end, indicated at $e^4$, deflected downward somewhat, so that the entering stream of liquid may be directed diagonally into the bottle somewhat to one side of its mouth. The duct $e^3$, in the particular construction shown, is connected with the pump F by means of a passage $f^{10}$, this passage being controlled by a spring supported valve $f^9$. The liquid to be delivered by the pump enters through a passage $f^6$ which is controlled by a valve $f^7$, and a passage $f^8$ all as clearly illustrated in Figs. 17 and 19. It will be noted that, in the particular construction illustrated, the passage $f^{10}$ enters the duct $e^3$ in advance of the point where the passage $e^2$ connects with the duct. This construction is particularly advantageous where the liquid to be delivered by the pump is a flavoring syrup, for the reason that the incoming rush of the water carries the charge of syrup with it into the bottle.

Whatever be the means employed by which the liquid to be bottled is supplied, in the best constructions embodying the invention, these means will be bottle controlled, that is to say, the supply of the liquid will be made to depend upon the presence in the machine of a bottle to be filled. The particular means by which the presence of a bottle to be filled in the machine may be made effective to control the liquid supply may be widely varied. In the best constructions, these means will include an actuator which is normally inoperative and which is properly positioned or caused to be operative by the presence of a bottle in the machine. In the particular machine illustrated, this actuator includes a rod $d$, this rod passing through a bracket extending from the head $C^7$ (see Fig. 5) and at its foot being swiveled in a short arm $d^5$ at the outer end of a lever $d^6$, this lever being hinged upon the frame rod $C^5$ and being provided with a lateral stud for a roller which engages a cam groove in the side of a cam $E'$ (see Figs. 1, 3 and 6). It will be apparent that as the shaft B rotates, this rod $d$ will be given vertical reciprocating movements. In the particular construction illustrated, the rod is provided with an adjustable tappet $e^5$. This tappet is so arranged that when the rod is properly positioned, it will strike the stem $e$ of the water controlling valve E and open the valve. This actuator rod is normally inoperative as it stands in such a position that its tappet will not strike the valve.

The actuator, whatever be its construction, is caused to be operative by the presence of a bottle on the presenting device. In the particular machine shown, the head $C^7$ of the bottle presenting device before referred to has pivoted to it a lever D, the pivot of this lever, marked $d^3$, being supported in a bracket on the head $C^7$. Secured to the pivot of this lever is a toothed segment $d^2$ which engages with long teeth formed on a sleeve $d'$ which surrounds the rod $d$. The lever D is held forward by a spring $d^4$ (see Fig. 5) and when the lever is thus in its forward position the rod $d$ is so turned that the tappet $e^5$ will not strike the valve stem $e$. When, however, a bottle is forced into proper position onto the carrier head $C^7$ the angular bottle centering lever D will be forced back against the spring and the actuator rod moved into its operative position. A suitable stop as $c^{11}$ (see Fig. 5) may be provided to coöperate with the lever D in centering the bottle on the carrier.

In the machines embodying the invention in its best form, as in the machine illustrated, the actuator not only controls the valve by which the carbonated water is admitted but also controls the operation of the pump by which the syrup or other liquid controlled by the pump is introduced. While this may be effected in various ways, as shown, the piston rod $f'$ of the pump (see Fig. 17) is provided with a cylindrical collar $f^5$, the upper portion of which may be formed as a finger piece so that the rod may be conveniently rotated for adjustment. The rod is threaded into a sleeved-hub $f^2$ which forms the top of the piston $f$ and between this hub and the piston rod there may be located a split bushing $f^3$. The top of the sleeved hub is engaged by a nut $f^4$ which bears against the top of the split bushing. The piston rod is or may be graduated, so as to enable varying amounts of liquid to be delivered by the pump. The actuator rod, in the particular construction illustrated, is provided with a second adjustable tappet $f^{11}$, this tappet having a circular recessed edge so that it may be engaged in close contact with the piston rod $f'$ below the collar $f^5$ when the actuating rod has been properly positioned by the placing of a bottle on the carrier $c^7$. As the actuator rod reciprocates, it will be understood that the pump piston will be also reciprocated and that varying amounts of liquid will be delivered by the pump, according to the adjustment of the piston rod. The farther the collar $f^5$ is from the collar $f^4$ the more lost motion there will be between the tappet $f^{11}$ and these collars, and, therefore, the less liquid will be delivered by the pump.

Means may be provided for holding the piston rod in properly elevated position when it is at rest. In the construction illustrated, these means consist of a spring detent $f^{12}$ (see Fig. 17) which frictionally engages with the lower side of the hub $f^5$.

When the machine is embodied in a machine similar to the particular machine illustrated, it is desirable to provide means for preventing a bottle from being placed on the carrier $C^7$ when the pump is not in proper position to deliver liquid. While this may be done in various ways, the construction already described is effective for this purpose, as, if the piston is not held raised by its detent, the long hub $f^5$ would, in case an attempt was made to place a bottle on the presenting device, present a surface against which the tappet $f^{11}$ would strike, thus preventing the movement of the positioning arm or lever D.

Figures 1, 2:
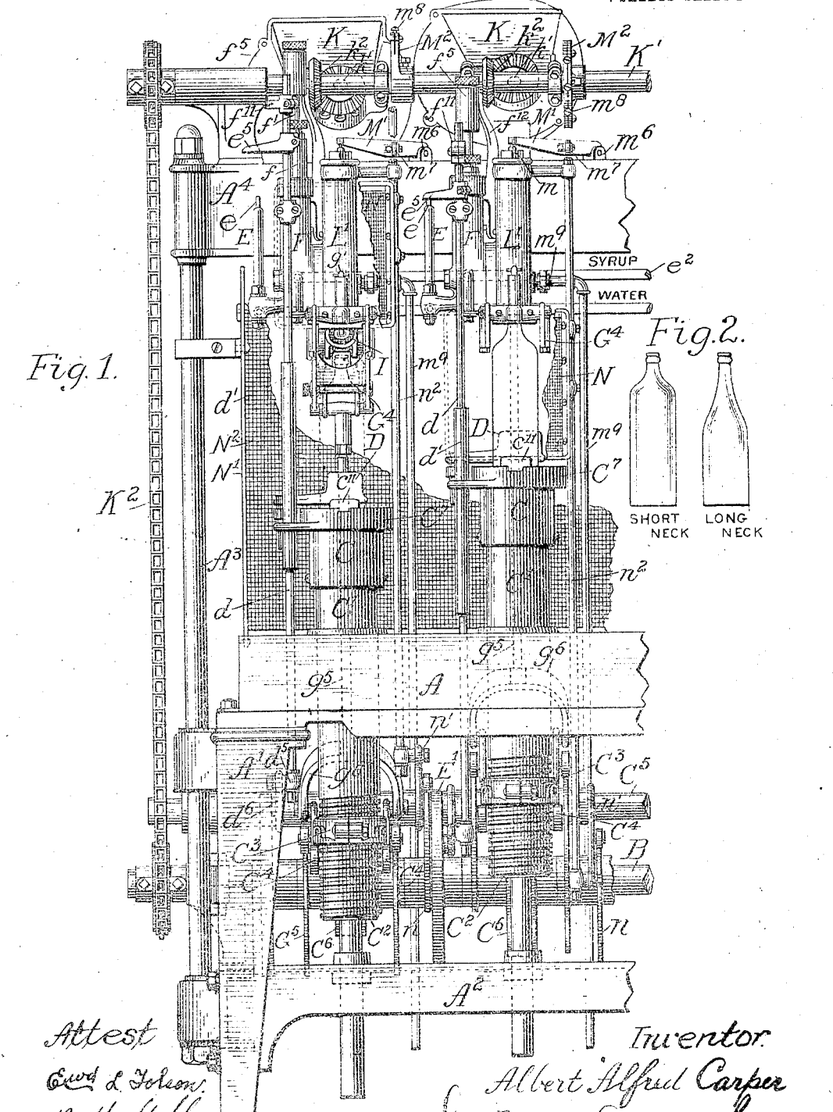
—Figure 1 is a front elevation of a portion of a bottling machine embodying the invention, two bottling mechanisms being shown.
Fig. 2 illustrates two common forms of bottles, one having a short neck and the other a long neck, indicative of different kinds which my machine can use.
Figures 21, 23:
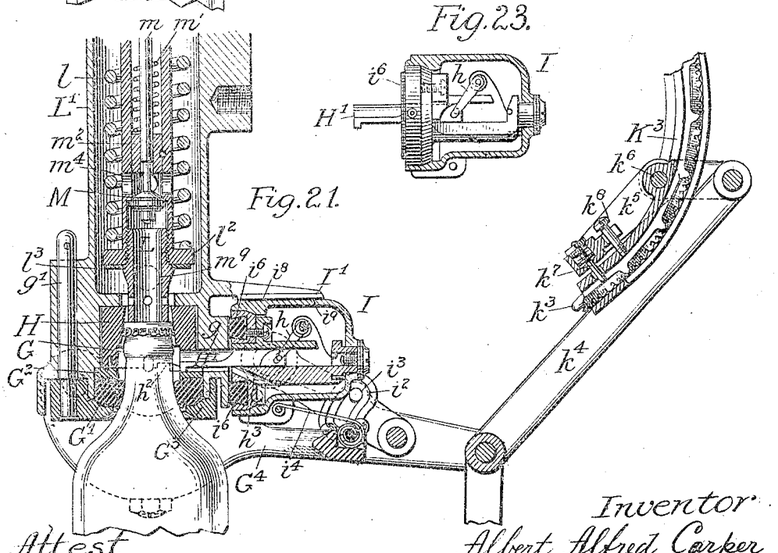

Machines embodying the invention will usually include means for applying closures, and in the best constructions the closure applying means will be adapted to apply metal sealing caps, such, for instance, as caps of the well-known "crown cork" type. While the closure applying mechanism may be varied in construction and will of course vary according to the character of closure to be applied, in the particular machine illustrated, the closure applying mechanism includes a cap applying head or tool H which is positioned near the bottom of the head L' which is suitably recessed to receive it. As is common in such constructions, this head has a tapered portion or throat, this tapered throat in the machine shown being located, in the upper part of the head. As illustrated, this head rests on the abutment ring $G^2$ before referred to, this abutment ring being provided with a dowel pin which is socketed into the lower edge of the capping tool, as shown in Figs. 1 and 21. The cavity within this hollow capping tool may serve as a filling chamber, the discharge end $e^4$ of the duct $e^3$ referred to by which the liquid is supplied, being formed partly in the wall of the capping tool below the tapered throat, and partly in the abutment plate $G^2$.

While the tapered throat might be depended upon alone for applying the caps, in the best constructions and in the machine shown, there will be employed in connection therewith means for applying pressure to the top of the cap, thereby forcing the cork disk or other packing usually contained in the cap firmly against the bottle lip before or near the beginning of the cap applying operation which, as is well known in applying caps of the crown cork type, consists in bending the flange of the cap inward so as to lock it to the bottle. While these pressure applying means may be varied in construction, in the particular machine shown, they comprise a cap plunger L partially housed in a chamber in the head L' the lower end extending into the filling chamber. The plunger may be surrounded by a strong normally compressed spring $l$ abutting at the top against a detachable head sleeve $l'$ and seated upon a plunger flange $l^2$ which in turn is seated upon a packing ring $l^3$.

In bottling liquids, and particularly when the liquids are discharged into a closed filling chamber, provision should be made for taking care of the air which is displaced from the bottle by the entering liquids, and when, as in the machine shown, liquids under pressure, such as carbonated waters, are to be bottled, provision should be made for a certain amount of gas which will escape from the bottle. While the filling chamber, in the particular machine shown, will accommodate a certain amount of air and gas, it is desirable that some pressure relieving means be employed in connection with the filling and cap applying mechanisms. These pressure relieving means may differ very widely in character. In the particular machine shown, however, the cap plunger L is made tubular, thus considerably increasing the capacity of the mechanism for taking care of the air displaced from the bottle and escaping gas before referred to. This plunger above the tubular portion referred to may be provided with ports $m^4$ and there may also be provided a valve M which finds its seat in the upper part of the hollow portion of the cap plunger. This pressure relieving valve, when employed, may be operated in various ways. As shown, it is provided with a stem $m$ extending through the tappet head sleeve $l'$, this stem being surrounded by a spring $m'$ seated upon a collar $m^2$ fast on the interior of the cap plunger L and bearing against a collar $m^3$ secured to the end of the stem. It is apparent that by forcing the plunger stem downward, the valve will be opened and that the excess accumulated air and gas will be allowed to escape through the port $m^4$ into the chamber L' and thence through a pipe as $m^9$. Additional lateral openings $m^5$ may be provided at the lower part of the plunger. These openings may receive a wrench for screwing the lower part of the plunger into place.

Figure 24:
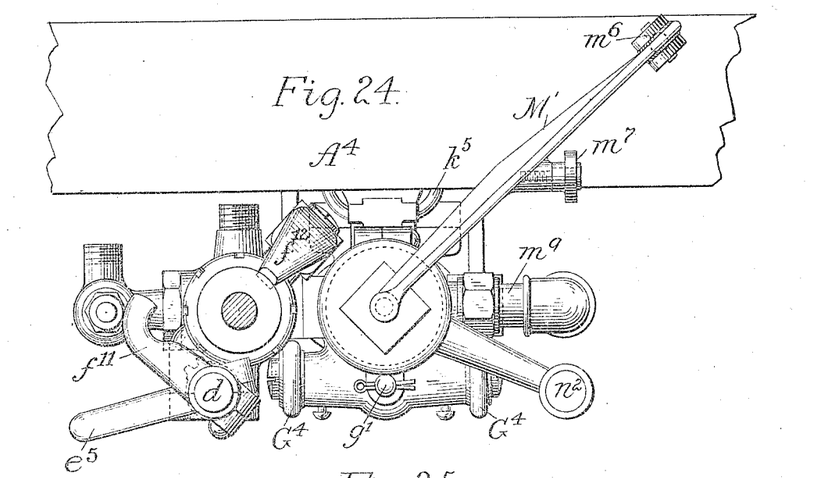
Fig. 24 is a top view of one of the filling heads illustrated in Fig. 1 and certain features of construction connected therewith.

When a pressure relief valve, such as has been referred to, is employed, it may be operated in various ways, but in the best constructions, it will be automatically operated. In the particular machine illustrated, (see Figs. 1 and 24), there is provided a valve operating lever M' which is pivoted at its rear in a bearing $m^6$ secured to the frame, the outer end of this lever overlying the valve stem $m$. Mounted on one side of the lever is a roller $m^7$ which lies in the path of suitable operating or striking devices by which the lever may be operated. While these operating or striking devices, when employed, may be of varying construction, as shown, they include a sector $M^2$, this sector being mounted upon a horizontal shaft K' suitably supported in bearings on the machine frame and driven in any suitable manner, as, for instance, by a chain of gearing $K^2$ from the cam shaft B. This sector, in the particular machine shown, is provided with a plurality of round headed screws $m^8$, one or more of which may be adjusted, so that as the shaft K' rotates, the roll $m^7$ will be struck thereby and the lever M' operated, thus operating the relief valve. The sector $M^2$ may be split in its screw carrying portion and provided with clamping screws (indicated in Figs. 1 and 3) so that such of the screws $m^8$ as are adjusted for service may be securely clamped against displacement.

While the closures may be supplied to the bottles to be capped in various ways, they will preferably be automatically supplied to the closure applying mechanism, this being especially feasible where caps of the crown cork type are to be applied. The cap supplying means, when such means are employed, may be varied widely in construction. In the particular machine illustrated, a plurality of cap supplying mechanisms are employed, there being one for each cap applying mechanism. As shown, there are provided a plurality of hoppers K to which the caps are supplied in a mass, these hoppers being located at the upper rear portion of the machine and being hinged by means of arms upon the horizontal shaft K' before referred to. Each hopper is provided with a rotating agitator $k$ mounted on a shaft $k'$, this shaft being driven from the shaft K' by bevel gears $k^2$ (see Fig. 1). Each hopper has rigidly connected to it a curved cap chute $K^3$ (see Figs. 3, 11, 20 and 21) into which the caps are delivered in a predetermined position. In the particular construction illustrated, the chutes and hoppers are rocked by mechanism which will be hereinafter described.

While, as has been indicated, any suitable cap forwarding and separating mechanism may be employed, in machines which embody the invention, that which has been just described is well adapted for the purpose, for the reason that although the shaft K' is constantly rotating, the agitator, which is driven therefrom, is at rest during one rocking movement of the hopper, because the beveled gear on the agitator shaft moves bodily with its engaged beveled gear rotating in the same direction. The agitator is, therefore, at rest during one rocking movement of the hopper and moving during the other movement, and during its movement it is rotated somewhat faster than the rotation of the shaft K', because then the agitator gear moves bodily in a direction opposite to that of the bevel gear with which it is engaged. This rocking of the hopper and the intermediate and variable movements of the agitator tends to maintain the mass of caps in a loose condition, so that they may readily be fed from the hopper.

When caps are to be fed automatically to a filling chamber, it is desirable that a cap port be provided through which the c ps are introduced into the filling chamber. In the particular machine illustrated, this cap port $g$ enters through the side of the filling chamber (see Figs. 11, 17, 20 and 21) the caps being fed to the port by causing the lower end of the chute $K^3$ to register therewith by means which will be hereinafter described.

Figure 12:
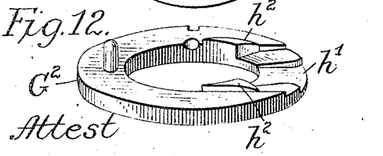
Figs. 12, 13 and 14 illustrate in perspective, plan and section, respectively, certain features of cap feeding mechanism which may be employed.
Figure 13:
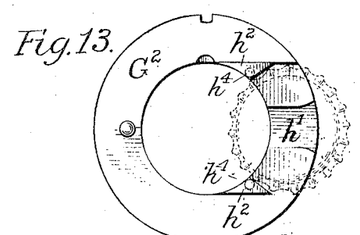
Figure 14:
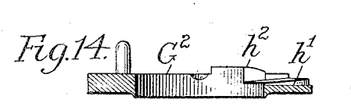
Figure 15:
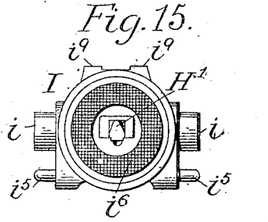
Fig. 15 is a front elevation of a construction which may be employed to seal a cap feeding opening or port in the filling head.
Figure 16:
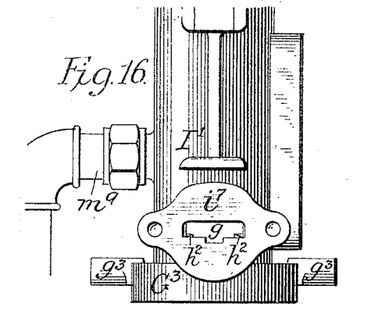
Fig. 16 is a rear elevation of part of one of the filling heads, showing a cap feeding opening or port.

It is desirable, particularly where short necked bottles are to be capped, to reduce the height of the filling chamber as much as possible, particularly where a capping tool having a tapered throat is employed, so as to insure the certain entry of the mouth of the bottle sufficiently far into the capping tool to enable it to bend in the flange of the cap and it is further desirable, when caps are automatically fed through a port in the side of the filling chamber, that the cap shall be so held during the filling operation as not to interfere either with the entry of the liquid into the bottle or the escape of air and gas from the bottle. While these conditions may be obtained in various ways, in the particular machine illustrated, the caps after being discharged from the chute $K^3$ are so positioned as not to interfere either with the discharge of liquid into the bottle or the escape of air and gas therefrom. As shown, this is effected by locating the abutment ring $G^2$ immediately below the cap port and providing it with cap positioning devices which may consist of two lugs or shoulders $h^2$ having hardened points $h^4$, said shoulders having a space between them of less than the diameter of a flange of the cap, the construction being well shown in Figs. 12, 13, and 14. This construction permits a cap entering through the port to project somewhat into the filling chamber, as indicated by dotted lines in Fig. 13, but not far enough to interfere either with the discharge of the liquid into the bottle or with the escape of air and gas therefrom. When thus positioned it can be readily advanced over the mouth of the bottle when the filling of the same is completed. The means employed in the particular machine shown for thus advancing the cap will be hereinafter referred to.

It has been heretofore stated that in the particular machine described the swinging cap chute is moved toward and away from the mouth of the cap port and it will be evident that when the cap chute registers with the cap port, the lowest cap in the chute free to move will be fed into the cap port. It is also apparent that means should be employed, when caps are fed to the cap port by a swinging member through which the caps descend by gravity, to prevent the lowest cap from being dropped out when the member is away from the cap port. It is of course apparent that means widely differing in construction may be employed for this purpose.

Figure 25:
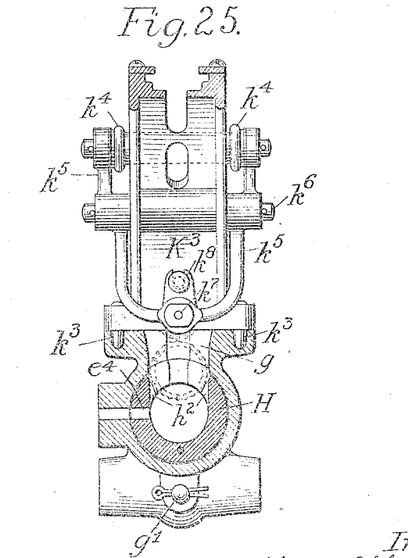
Fig. 25 is a sectional plan view of one of the filling heads illustrated in Fig. 1, the plane of section cutting the cap chute.

It has been heretofore stated that the swinging movements of the cap chute may be effected in various ways. In the particular machine shown, these movements of the cap chute are effected by the gasket compressing lever $G^4$. While the connections for accomplishing this movement of the cap chute may be of any suitable character, they may also be so constructed as to effect the locking in position of the lowest cap. In the particular machine illustrated, the levers $G^4$ have connected to them a pair of links $k^4$ which links are in turn connected to the arms of a bow or bell-crank lever $k^5$ pivoted at $k^6$ to the lower end of the cap chute $K^3$ (see Figs. 11 and 25). The forward end of this bow or bell-crank lever is provided with a spring pin $k^7$ so positioned that it may bear upon the top of the lowest cap in the chute and thus hold it in position. The parts are so arranged that as the levers $G^4$ move up the bow or bell-crank lever $k^5$ will be first moved down so as to bring the spring pin $k^7$ into contact with the top of the lowest cap in the chute, after which the further movement of the levers $G^4$ swings the cap chute away from the mouth of the cap port, the two positions of the chute and holding pin being well shown in Figs. 11 and 20. Suitable limiting means, as, for instance, the screw $k^8$, may be employed to prevent an undue movement of the lever $k^5$. Alining pins $k^3$, when the chute advances, enter sockets in the head casing.

Figure 10:
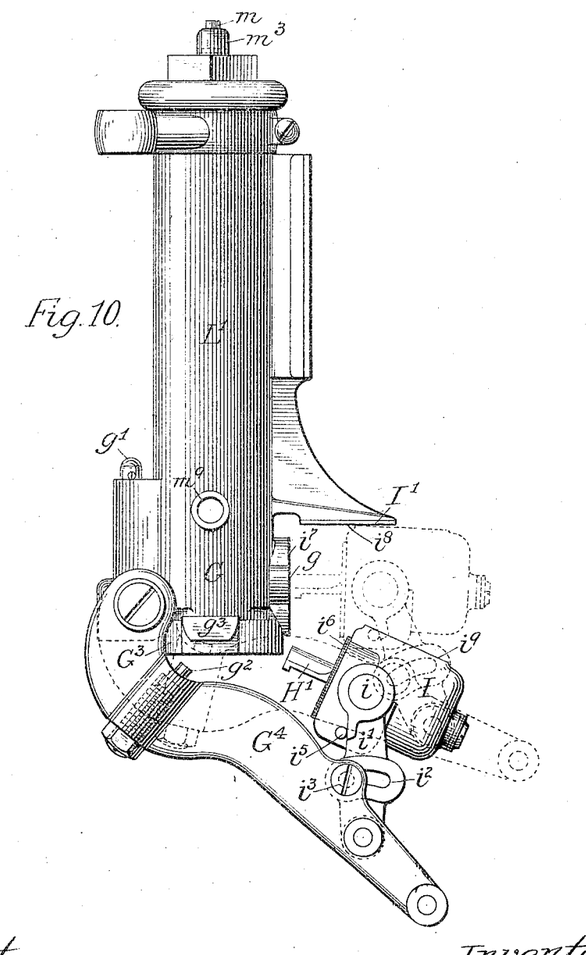
Fig. 10 is an enlarged side view of one of the heads containing the filling chamber and certain parts operatively connected with the head.
Figure 11:
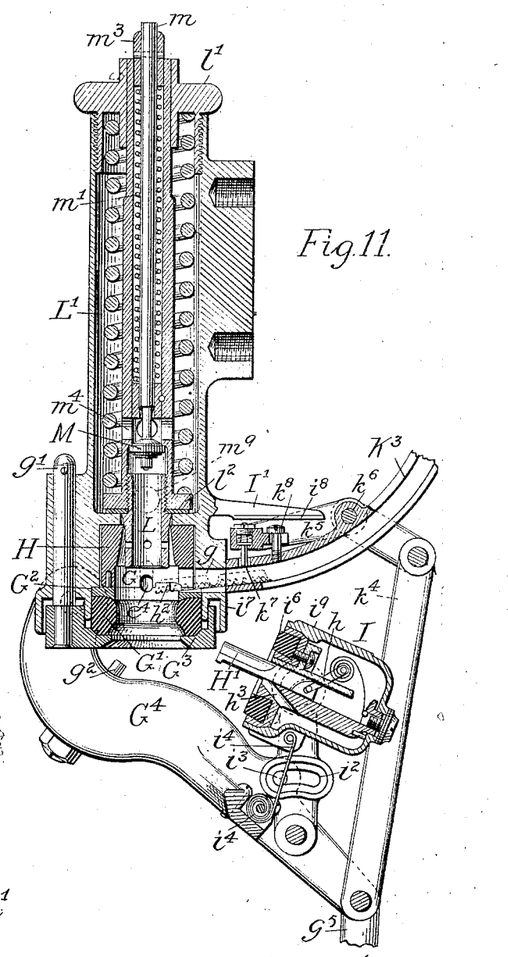
Fig. 11 is a central vertical section of the construction shown in Fig. 10.

After the cap chute has inserted its cap into the port and moved away, the next operation, in machines in which a sealed cap port is employed, is to seal the mouth of the port. As has been indicated, this may be accomplished by widely different constructions. In the particular machine illustrated, this is effected by connections from the arms $G^4$ before referred to. As shown, these arms support a sealing device in the form of a block I, this block being (see Fig. 11) provided with a gasket $i^6$ which is brought into register with the cap port, the wall surrounding the port being, if desired, faced off, as indicated at $i^7$, so that a reliable seal may be effected by the gasket. The block I is provided with trunnions $i$, see Figs. 10 and 22, and limiting stops $i^5$, these trunnions being supported in a yoke frame $i'$ which is pivoted to and between the lever arms $G^4$. The side of the yoke frame $i'$ may be provided with a slotted boss $i^2$, the slots being occupied by studs $i^3$ projecting inward from the levers $G^4$, this construction serving to limit the movement of the yoke frame $i'$. The block may be held in proper position so as to engage with the surface $i^7$ by means of a spring $i^4$ (see Figs. 20 and 21) which is secured to a rod carried by and located between the levers $G^4$ and to the underside of the block. The head $L'$ may, if desired, be provided with a guiding extension I which serves to accurately direct the block in its sealing position by contract of the bearing surfaces $i^8$ and $i^9$. The position of the block I when out of service is well illustrated in Fig. 10, and by comparing this figure with Figs. 20 and 21, it will be apparent that as the levers $G^4$ move up the block is moved into its sealing position. It will be understood that at the time the block moves into its sealing position, a cap has been fed by the chute into the cap port and is resting against the lugs $h^2$. The port having been sealed and the filling operation completed, it remains, in the particular machine illustrated, to effect the capping operation. In order to effect this, the cap, in the particular machine described, is released from the stop shoulder $h^2$ and transferred into position upon the mouth of the bottle. As has been indicated, the positioning of the cap upon the bottle mouth may be effected in various ways. In the particular machine shown, this is accomplished in part by the upward movement of the bottle and in part by other means. As shown, the block I which is hollow carries a pushing finger $H'$ which is slidably mounted in the block and is yieldingly held in its forward position (see for instance, Fig. 11) by spring controlled arms $h$. This finger is so located that when the block I is swung into sealing position the pushing finger $H'$ which is in line with the low part $h'$ of the recess of plate $G^2$ engages the edge of the cap and is forced back against the pressure of the spring arms $h$. As the bottle after being filled moves upward through the filling chamber into the position where the cap is to be applied, it strikes the projecting edge of the cap, (see dotted lines in Figs. 11 and 13) and tilts the cap so as to free it from the shoulders $h^2$. The cap being thus free from the restraining influence of the shoulders, the finger $H'$ shoots it forward across the bottle mouth, the further movement of the bottle carrying the cap upward against the bottom of the cap plunger L which forces it down upon the bottle mouth, and the still further movement of the bottle presenting means forcing the flange of the cap against the tapering throat of the capping tool which operates to bend in the cap flange and lock it to the bottle. $h^3$ is a duct in the cap port sealing device for equalizing the gas pressure in rear of the finger $H'$ with that in the filling chamber.

In operating the capping machines, especially where liquids under considerable pressure are being bottled, there is more or less danger of the bottles bursting. To prevent injury to the operator, suitable screens or guards may be provided, and in the particular machine shown, there is one of these screens or guards for each bottling mechanism, and these screens or guards are so mounted as to be moved out of operative position to permit the bottles to be placed in the bottling mechanism, and into position thereafter. While the construction may be varied, as illustrated, these guards, marked N, are carried on vertically movable rods $n^2$, these rods being operated by means of levers $n'$ hinged upon the rod $C^5$ and cams $n$. As a further protection against flying glass, there may be at each end of the machine a light guard $N'$, and between these plates a wire screen $N^2$.

While the machine illustrated is very efficient for the bottling of charged or carbonated waters, and especially where a flavoring extract or syrup is added during the bottling operation to the contents of each bottle, it will be understood that the invention may be embodied in constructions which differ widely from the construction illustrated. Further, it will be understood that certain features of the invention are capable of use independently of other features, and that such independent use is contemplated. The invention is not, therefore, to be restricted to the specific construction heretofore described and illustrated in the accompanying drawings.

In operating the machine illustrated, any one of the sets of mechanisms may be out of service without affecting the others, for each set is bottle-controlled as to its liquid feed and cap feed, and if no bottle is placed in position, that set of mechanism simply runs idly. Some or all of the sets may be run with only one active source of liquid supply if desired.

The sets of mechanisms may be adjusted so that bottles of one size may be used at one set while bottles of a different size are being used at another set.

Figures 20, 22:
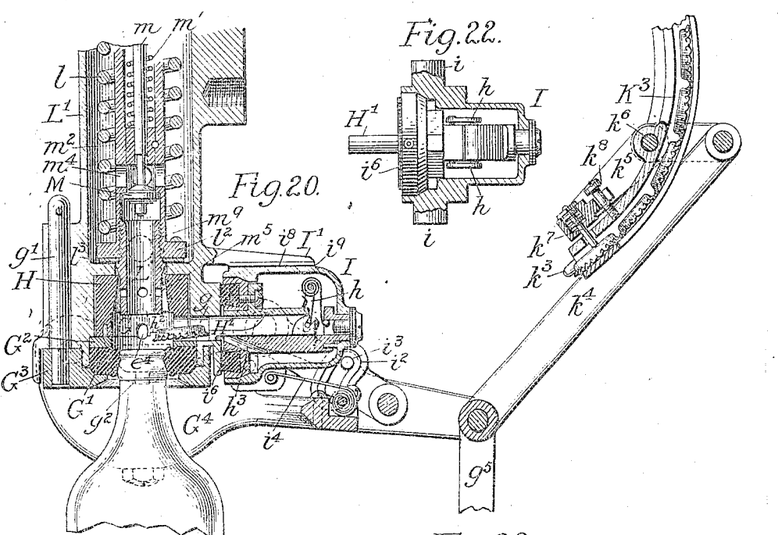
Figs. 20 and 21 illustrate, in sectional side elevation a part of one of the filling heads shown in Fig. 1 and certain features of construction connected therewith, certain parts being shown in different positions in the two figures.
Figs. 22 and 23 illustrate, respectively, in plan and side elevation, the cap port sealing device illustrated in Fig. 15, parts being in section.

Briefly stated the operation of the machine is as follows: The attendant places a bottle on the lowest bottle presenting device, then on the one which next reaches its lowest position until all are carrying bottles. The filling head above the bottle carrier first served will, in the meantime, have been closed by the contraction of the gasket and the closing of the cap port by the pad block, and the head of the bottle will have been properly engaged with or by the gasket, whereupon the carrier rests with a bottle head, as indicated in Fig. 20. Simultaneously with the operation of the gasket and the pad block, the actuator $d$ which was positioned by placing the bottle upon the presenting device, descends, operating the pump and the liquid supply valve. After a partial filling, and when the pressure in the filling chamber checks the entrance of liquid to the bottle, the pressure relief valve M is quickly opened and closed, thus reducing the pressure in the filling chamber and permitting further delivery of liquid to the bottle, and this pressure reducing action may be repeated if necessary to complete the filling of the bottle. The water valve closes as the actuator rod $d$ rises, and the rod $d$ through its tappet, lifts the pump piston to draw in a fresh charge of liquid such, for instance, as syrup. As soon as the filling ceases, the bottle presenting device resumes its upward movement with the bottle, causing its lip to tilt and release the cap from the lugs $h^2$, so that the spring finger H will project the cap over the bottle to be carried thereby up to the capping plunger and the capping tool, for applying the cap. The gasket will now be relieved from compression and the capped bottle lowered. The cap port having been opened, the cap chute swings forwardly, and delivers another cap into the cap port, and then retires, permitting the sealing block to resume its duty, and so on throughout the range of each organization, each operating so far out of time with relation to all of the others that each may perform its separate duty, and all may be regularly served by one attendant.

What is claimed is:—

1. In a bottling machine, the combination with a plurality of sets of bottling mechanisms, each set including a bottle presenting device and a closure applying mechanism, of liquid supplying devices, and means for continuously operating said sets out of time.

2. In a bottling machine, the combination with a plurality of sets of bottling mechanisms, each set including a bottle presenting device, a closure applying mechanism and a closure supplying mechanism, of liquid supplying devices, and means for continuously operating said sets out of time.

3. In a bottling machine, the combination with a plurality of sets of bottling mechanisms fixed against lateral movement, each set including a bottle presenting device, of a plurality of sources of liquid supply for different liquids including connections whereby each bottle may be filled from said sources, and means for operating said sets out of time.

4. In a bottling machine, the combination with a plurality of sets of bottling mechanisms, each set including a bottle presenting device and a closure applying mechanism, of charged liquid supplying devices, still liquid supplying devices, connections whereby each bottle may be filled with both still and charged liquids, and means for operating said sets out of time.

5. In a bottling machine, the combination with a plurality of sets of bottling mechanisms, each set including a bottle presenting device, a closure applying mechanism and a closure supplying mechanism, of charged liquid supplying devices, still liquid supplying devices, connections whereby each bottle may be filled with both still and charged liquids, and means for operating said sets out of time.

6. In a bottling machine, the combination of a plurality of sets of bottling mechanisms fixed against lateral movement, each of said sets including a bottle presenting device and a bottle controlled liquid supplying device, and means for continuously operating said sets out of time, said means operating to bring the bottles successively into filling relation with their filling devices, substantially as described.

7. In a bottling machine, the combination of a plurality of sets of bottling mechanisms fixed against lateral movement, each set including a bottle presenting device, a liquid supplying device and a cap applying device, and means for continuously operating said sets out of time, substantially as described.

8. A bottling machine having a plurality of sets of bottling mechanisms fixed against lateral movement, each set including a normally reciprocating bottle presenting device, a closure applying device, a liquid supplying device, bottle controlled means for each set for controlling the liquid supplying device of its own set independently of the other sets, and means for operating the sets out of time.

9. A bottling machine comprising a plurality of sets of bottling mechanisms fixed against lateral movement, each set including a normally reciprocating bottle presenting device, a liquid supplying device, a normally inoperative actuator for the liquid supply device, a bottle controlled means for rendering the said actuator of its own set effective independently of the other set or sets, and means for operating the sets out of time, substantially as described.

10. A bottling machine comprising a plurality of sets of bottling mechanisms, each including a filling head, a cap applying device therein, a bottle controlled cap feed, a bottle controlled liquid supplying device, and means for operating the sets out of time, the cap feed and liquid supply device of each set being controlled by the bottle at that set independently of the other set or sets, substantially as described.

11. In a bottling machine, the combination with a plurality of bottling mechanisms fixed against lateral movement, each set including a bottle presenting device, of a plurality of sources of liquid supply for different liquids including connections controlled by the bottle in each set whereby each bottle may be filled from said sources, and means for operating said sets out of time.

12. In a bottling machine, the combination with a plurality of sets of bottling mechanism, each set including a bottle presenting device and a cap applying mechanism, of liquid supplying means for each mechanism, means for each mechanism controlled by the bottle to be filled by that mechanism for rendering effective the liquid supplying devices of that mechanism and means for operating said sets out of time.

13. In a bottling machine, the combination of a plurality of sets of bottling mechanisms, each set including a bottle presenting device, a liquid supply valve for each set, cap applying mechanism for each set, a pressure relief valve for each set for relieving the pressure in the bottle and filling chamber during the filling of the bottle, and means for continuously operating said sets out of time.

14. In a bottling machine, the combination with a plurality of sets of bottling mechanisms, each set including a bottle presenting device, of liquid supplying devices, cap supplying devices, cap applying devices, means for relieving the pressure in the bottles, bottle controlled means for rendering operative the liquid supplying devices, and means for continuously operating said sets out of time.

15. In a bottling machine, the combination with a plurality of sets of bottling machanisms each set including a bottle presenting device, of liquid supplying devices for each set, cap supplying devices, cap applying devices for each set, bottle controlled means for rendering the liquid supplying devices operative, and means for continuously operating said sets out of time.

16. In a bottling machine, the combination with a plurality of sets of bottling mechanisms fixed against lateral movement each set including a bottle presenting device, of means for operating said sets continuously and out of time, liquid supplying devices for each set, and means for varying the relation between the presenting devices and the liquid supplying devices whereby the sets may be adjusted for bottles of different lengths.

17. A bottling machine comprising a plurality of sets of bottling mechanisms each set including a bottle presenting device, of a filling chamber for each set, liquid supplying devices, a cap applying mechanism for each set, means for continuously operating said sets out of time, and means for adjusting the bottle presenting devices with respect to the filling chambers.

18. In a bottling machine, the combination with a plurality of sets of bottling mechanisms each set including a bottle presenting device and a closure applying mechanism, of means for operating said sets out of time, connections including a valve arranged to communicate with a source of charged liquid supply, connections including a pump connected with a source of still liquid supply, and means for automatically operating the valve and pump.

19. In a bottling machine, the combination with a plurality of sets of bottling mechanisms each set including a bottle presenting device and a closure applying mechanism, of means for operating said sets out of time, connections including a valve arranged to communicate with a source of charged liquid supply, connections including a pump connected with a source of still liquid supply, and means controlled by the presence of a bottle on the presenting device for automatically operating the valve and the pump.

20. In a bottling machine, the combination with a plurality of sets of bottling mechanisms each set including a bottle presenting device and a closure applying mechanism, of means for operating said sets out of time, connections including a duct for communicating with a source of charged liquid supply, a valve in said connections, connections including a pump for communicating with a source of still liquid supply, said connections communicating with the duct between the valve and the discharge end thereof, and means for automatically operating the valve and the pump.

21. In a bottling machine, the combination with a plurality of sets of bottling mechanisms, each set including a bottle presenting device and a closure applying mechanism, of means for operating said sets out of time, connections including a duct for communicating with a source of charged liquid supply, a valve in said connections, connections including a pump for communicating with a source of still liquid supply said connections communicating with the duct between the valve and the discharge end thereof, and means controlled by the presence of a bottle on the presenting device for automatically operating the valve and pump.

22. A bottling machine having a bottling mechanism fixed against lateral movement and comprising in combination a filling head, a liquid supply device, a normally reciprocating bottle presenting device, and bottle controlled means moving therewith for controlling the liquid supply device, substantially as described.

23. A bottling machine having a bottling mechanism fixed against lateral movement and comprising in combination a filling head, a liquid supply device, a normally inoperative actuator for the liquid supply device, a normally reciprocating bottle presenting device, and bottle controlled positioning means for the actuator, substantially as described.

24. In a bottling machine, the combination with a filling chamber, of continuously operating bottle presenting devices, operating means, liquid supplying devices, a normally inoperative actuator, means whereby the actuator controls the liquid supplying devices, connections between the actuator and the operating means, and means for rendering the actuator operative.

25. In a bottling machine, the combination with a filling chamber, of a bottle presenting device, liquid supplying means including a controlling valve, a continuously driven power operated actuator, means whereby the actuator operates the valve, and a bottle controlled positioning device connected with the actuator.

26. In a bottling machine, the combination with a filling chamber, of a bottle presenting device, means for centering and clamping the bottle on said device, liquid supplying means, including suitable controlling means, and an operating connection between the centering means and the controlling means.

27. In a bottling machine, the combination with a plurality of filling and capping heads each of said heads having cap applying devices, of a bottle presenting device cooperating with each head, driving means therefor, liquid supplying devices for each head each including a suitable valve, actuating means for said valves, and means rendered effective by the presence of a bottle on the presenting device for causing the actuating means to operate the valve of its own set.

28. In a bottling machine, the combination with a filling chamber, of means for supplying liquid thereto, cap applying means, cap feeding means, a bottle presenting device, the liquid supplying and cap feeding means being rendered effective by the presence of a bottle on the presenting device and means for moving the presenting device.

29. In a bottling machine, the combination with a filling chamber, of means for supplying liquid thereto, controlling devices for said liquid supplying means including a normally inoperative actuator, cap applying means, cap feeding means, and a bottle presenting device, the actuator and cap feeding means being rendered effective by the presence of a bottle on the presenting device and means for moving the presenting device.

30. In a filling machine, the combination with a plurality of sources of liquid supply for different liquids, of a filling chamber, means for supplying liquid from said sources to the filling chamber said means including suitable controlling devices, an actuator common to the controlling devices, and bottle controlled positioning devices for the actuator.

31. The combination with a filling chamber, of a source of liquid supply, a second source of liquid supply, connections between said sources and the filling chamber, a valve for controlling the delivery from one source of supply, a pump for effecting the delivery from the other source of supply, a normally inoperative power operated actuator for operating both the valve and the pump, a bottle presenting device, and means whereby the presence of a bottle on the presenting device renders the actuator operative.

32. The combination with a filling head, of a pump cylinder, connections between the pump cylinder and the filling head, a piston, a piston rod, an operating connection for said piston rod, and a holding device for retaining the piston in its uppermost position until engaged and forced down by the operating connection.

33. The combination with a filling head, of a source of liquid supply, including a pump, a bottle presenting device, and means for preventing the placing of a bottle on the presenting device when the pump is out of adjustment.

34. The combination with a filling head, of means for supplying liquid thereto, including a pump, a bottle presenting device, an actuator for the pump, and connections whereby the placing of a bottle in position renders the actuator effective, said connections also being arranged to prevent the placing of a bottle in position when the pump is out of adjustment.

35. The combination with a filling chamber, of means for presenting a bottle thereto, liquid supplying means, a cap port, means movable toward and away from the port to supply caps thereto, and means independent of the cap supply for sealing the port.

36. The combination with a filling chamber, of means for presenting a bottle thereto, liquid supplying means, a cap port, a chute movable toward and away from the port for supplying caps thereto, a retaining device for the caps in the chute, and sealing means for the port.

37. The combination with a filling chamber, of means for presenting bottles thereto, liquid supplying means, cap applying means, a cap feed, and cap positioning devices, the feed being rendered effective by the removal of a cap from the positioning devices.

38. The combination with a filling chamber, of means for presenting bottles thereto, liquid supplying means, cap applying means, a cap port, a cap feed, cap positioning devices, the feed being rendered effective by the removal of a cap from the positioning devices, and means for sealing the cap port.

39. The combination with a filling chamber, of means for supplying liquid thereto, a cap port, means for automatically feeding the caps to the port, positioning devices for holding the caps to one side of the filling chamber, cap applying means in the chamber, bottle presenting devices, sealing means for the cap port, and means for automatically shifting a cap into position to be applied after the filling operation is completed.

40. The combination with a filling chamber, of cap applying means located in the chamber, means for directing liquid into the chamber at one side thereof, a cap port, devices for automatically feeding caps to the port, means for automatically moving said devices toward and away from the port, automatic means for sealing the port, positioning means for holding the caps to one side of the filling chamber and overhanging the same, a bottle carrier, power driven means for operating the bottle carrier to present the bottle first to the filling chamber and thereafter to the cap applying means, and a spring driven shifting finger for moving the cap across the mouth of the bottle as the cap is lifted away from the positioning means by the bottle.

41. The combination with a filling chamber having a gasket, of means for supplying liquid thereto, a cap port, a chute for feeding caps to the port, a gasket compressor, a port sealing block, and connections between the gasket compressor, the sealing block and the chute whereby, as the gasket and block are moved into operative position the chute is moved out.

42. The combination with a filling chamber having a gasket, of means for supplying liquid to said chamber, means for presenting a bottle thereto, a cap port, a sealing block for the port, means for guiding the block into position in register with the port, a gasket compressor, and connections between the compressor and the sealing block.

43. The combination with a filling chamber, of means for supplying liquid thereto, a bottle presenting device having a vertically movable spring supported head, means for preventing rotation of the head, a bottle centering device mounted on the head, and means coöperating with the centering device for controlling the operation of the liquid supplying means.

44. The combination with a filling chamber, of means for supplying liquid thereto, cap applying means, a chute for supplying caps, a cap port, means for moving the chute toward and away from the port, means for sealing the port when the chute is moved away therefrom, and means for retaining the caps in the chute when it is moved away.

45. The combination with a filling chamber, of means for supplying liquid thereto, cap applying means, a chute for supplying caps, a cap port, means for moving the chute toward and away from the port, means for sealing the port when the chute is moved away therefrom, a holding pin for retaining the caps in the chute, and means for automatically operating the pin.

46. In a bottling machine, the combination with a plurality of bottling mechanisms each including a capping and a filling mechanism and a bottle presenting device, of cap feeding mechanism for each bottling mechanism, said mechanism including a hopper for receiving the caps in a mass, agitators, and means for giving the agitators an intermittent movement.

47. The combination with a filling chamber, of a capping mechanism including an annular capping tool, and a pressure relief passage extending through said annular capping tool for the escape of air or gas from the filling chamber during the filling of the bottle.

48. The combination with a filling chamber, of a capping mechanism including an annular capping tool, a pressure relief passage extending through said annular capping tool for the escape of air or gas from the filling chamber during the filling of the bottle, and a valve for controlling the passage.

49. The combination with a filling chamber, of a capping mechanism including a cap plunger, a pressure relief passage in the plunger for the escape of air or gas from the filling chamber during the filling of the bottle, a valve for controlling the passage, and means for automatically operating the valve.

50. The combination with a filling chamber, of two sources of liquid supply for different liquids, an actuator for controlling the flow of liquid from said sources, a cap port, cap applying means, and means for automatically sealing the port.

51. The combination with a filling chamber, of two sources of liquid supply for different liquids, an actuator controlling the flow of liquid from said sources, a cap port, means for automatically feeding the caps to the port, cap applying means, and means for automatically sealing the port.

52. In a bottling machine, the combination with a plurality of bottling mechanisms each including filling and capping mechanisms, of pressure relieving devices, and a shaft provided with a plurality of adjustable operating cams for said pressure relieving devices.

53. In a bottling machine, the combination with a plurality of sets of bottling mechanisms each including a bottle presenting device, a filling means and a cap applying means, of means for holding caps in a mass and supplying them to said mechanisms, and means for operating the sets out of time.

54. In a bottling machine, the combination with a plurality of bottling mechanisms each including a capping mechanism, a filling mechanism and bottle presenting devices, of cap feeding mechanism for each bottling mechanism said mechanism including a hopper for receiving the caps in a mass, and an agitator, a shaft, and operating connections between said shaft and the agitator.

55. In a bottling machine, the combination with a plurality of bottling mechanisms each including capping and filling mechanisms, of pressure relief devices, a cap feeding mechanism for each bottling mechanism, said mechanism including a hopper for receiving the caps in a mass and an agitator, a shaft, and operating connections between the shaft and the pressure relief devices.

56. In combination a filling head, a bottle presenting device, bottle holding means on said device, means for giving one of said parts a movement toward and from the other, means for delivering liquid to the filling head, and controlling means actuated by the placing of a bottle on the presenting device in proper position to be filled, said controlling means being in engagement with the holding means for controlling the delivery means, substantially as described.

57. In a bottling machine, a filling head having a capping tool and a cap port, means for arresting the caps in position at one side of the filling chamber, automatic means for sealing the cap port and a cap driving finger carried by the automatic cap port sealing means, substantially as described.

58. In a bottling machine, the combination of a head having a filling chamber at its lower part, a capping tool having a passage therethrough, a controlling valve for said passage with a stem extending upwardly and above the head with means for operating the same, substantially as described.

59. In a bottling machine, a filling chamber, a bottle presenting device, two sources of liquid supply connected with the filling head for supplying different liquids, a controlling device for each, and means controlled by the bottle to be filled with said liquids for operating first one liquid device and then the other, substantially as described.

In testimony whereof, I affix my signature in presence of two witnesses.

ALBERT ALFRED CARPER

Witnesses:
Wm. C. Wood,
C. John Beeuwkes.